March 2, 1926.
W. LA HODNY
1,574,907
WINDSHIELD WING MOUNTING
Filed April 25, 1925
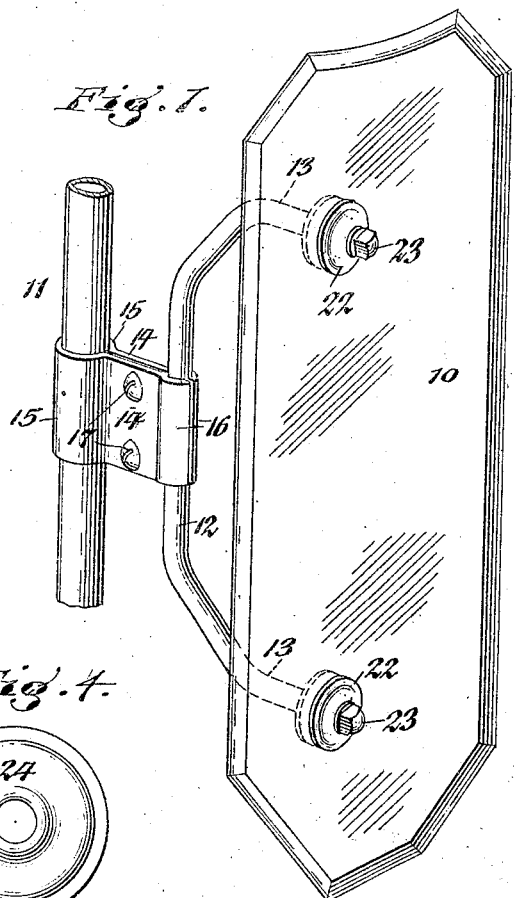
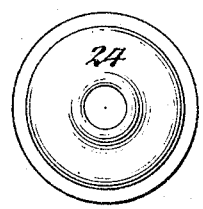
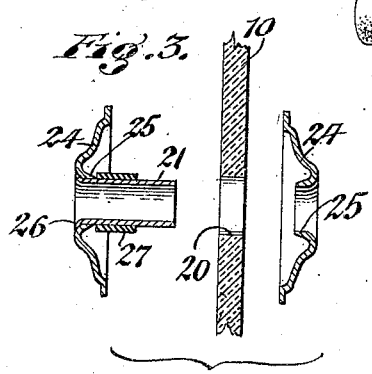
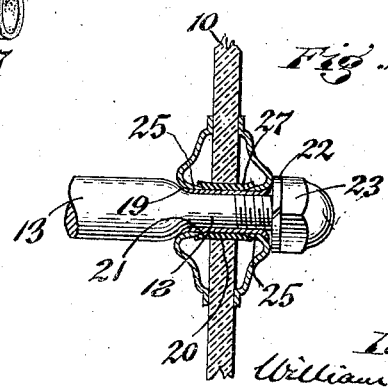
Inventor
William La Hodny
by Poff & Powers
Attys.

Patented Mar. 2, 1926.

1,574,907

UNITED STATES PATENT OFFICE.

WILLIAM LA HODNY, OF BUFFALO, NEW YORK, ASSIGNOR TO STANDARD MIRROR COMPANY, INC., OF BUFFALO, NEW YORK, A CORPORATION OF NEW YORK.

WINDSHIELD-WING MOUNTING.

Application filed April 25, 1925. Serial No. 25,800.

*To all whom it may concern:*

Be it known that I, WILLIAM LA HODNY, a citizen of the United States, residing at Buffalo, in the county of Erie and State of New York, have invented new and useful Improvements in Windshield-Wing Mountings, of which the following is a specification.

This invention relates to a mounting for glass windshield wings and has for its object the provision of means whereby such wings may be so mounted that they will be reliably supported without liability of rattling, becoming loose or fracturing the glass.

With this end in view this invention consists generally of an arm which passes through an opening in the windshield wing a rigid sleeve mounted on the arm within said opening and provided with disks bearing against opposite sides of the windshield, and a resilient bushing or tubular cushion surrounding the arm within said opening of the wing.

In the accompanying drawings:—

Figure 1, is a windshield wing provided with my improved mounting.

Figure 2, is a longitudinal section of the same on an enlarged scale.

Figure 3, is a sectional view showing parts of the mounting detached from each other and ready to be assembled with the windshield wing.

Figure 4, is an elevation of one of the clamping disks.

Figures 5 and 6, are perspective views of the sleeve or ferrule and the resilient bushing forming part of the mounting.

Similar characters of reference indicate like parts throughout the several views.

The numeral 10 represents one of the windshield wings which is made of glass as usual, and 11 represents an upright post, rod or bar which forms part of the windshield frame or other available part of the car for mounting the windshield wing thereon.

The mounting embodying this invention comprises a bracket having an upright bar 12 provided at its upper and lower ends with horizontal arms 13, 13 which are attached to the windshield wing, and a clamp whereby said bracket is mounted on the supporting post or bar 11 so that the wing can be swung horizontally into various positions as desired. This clamp, as shown in the drawings, may consist of two clamping plates 14 having jaws 15, 16 at their opposite ends which are held in frictional engagement with opposite sides of said post 11 and the central part of the bracket by clamping screws or bolts 17 connecting the central parts of said plates.

Each arm of the bracket has its front end reduced to form a neck 18 of small diameter and a forwardly facing shoulder 19 between the body of said arm and its neck and the front of said neck is provided with an external screw thread. The neck of each arm is adapted to pass through an opening 20 in the windshield wing and to be secured thereto by the following means which, according to the preferred embodiment of this invention, are constructed as follows:—

The numeral 21 represents a sleeve or ferrule of metal mounted on the neck of the bracket arm between the shoulder thereof and a lock washer 22 which is backed up by a screw nut 23 on the front threaded end of the neck. On opposite sides of the wing are arranged metal clamping disks 24, 24 which are preferably of cup or dish form and bear with their outer marginal parts against opposite sides of the windshield wing around the opening therein while the inner parts of these disks are provided with inwardly turned collars 25 which are mounted on the end portions of said sleeve or ferrule. The latter and the disks are preferably held in a permanently assembled position relatively to each other by providing the extremities of this sleeve with outwardly turned flanges 26 which engage with the outer side of said disks adjacent to the bore thereof and thus operate in a manner similar to connecting the disks by a hollow rivet.

Surrounding the sleeve or ferrule and the adjacent parts of the collars is a resilient bushing or tubular cushion 27 of rubber or similar material which engages its periphery with the bore of the respective opening in the windshield wing, as shown in Fig. 2.

By this means a grommet is formed which is attached to the glass windshield wing which permits of firmly connecting the wing to the supporting bracket yet provides sufficient resilience of contact which will prevent breakage of the glass due to vibration or abnormal pressure, and also preventing the wing from becoming loose or rattling while in use.

I claim as my invention:—

1. A mounting for windshield wings comprising an arm adapted to pass through an opening in the wing and provided on one side of the same with a shoulder and on the opposite side of the same with a screw nut, a metal sleeve arranged on said arm between its shoulder and nut and adapted to project through said opening, disks adapted to engage at their outer part with opposite sides of said wing while their inner parts engage with the opposite ends of said sleeve, and a resilient bushing surrounding said sleeve and adapted to engage the bore of the opening in said wing.

2. A mounting for windshield wings comprising an arm adapted to pass through an opening in the wing and provided on one side of the same with a shoulder and on the opposite side of the same with a screw nut, a metal sleeve arranged on said arm between its shoulder and nut and adapted to project through said opening, disks adapted to engage their outer parts with opposite sides of said wing and provided on their inner parts with inwardly projecting collars which surround the sleeve, and a resilient bushing surrounding said sleeve and adapted to engage the bore of said opening.

3. A mounting for windshield wings comprising an arm adapted to pass through an opening in the wing and provided on one side of the same with a shoulder and on the opposite side of the same with a screw nut, a metal sleeve arranged on said arm between its shoulder and nut and adapted to project through said opening, disks adapted to engage opposite sides of the wing and mounted on opposite ends of said sleeve, the extremities of the sleeve being provided with outwardly turned flanges which engage with the outer sides of said disks, and a resilient bushing surrounding said sleeve between said disks and adapted to engage with the bore of said opening.

4. A mounting for windshield wings, comprising an arm adapted to pass through an opening in said wing, a sleeve mounted on said arm and adapted to extend through said opening and provided at opposite ends with disks which are adapted to engage with opposite sides of said wing, and a resilient bushing surrounding said sleeve and adapted to engage the bore of the opening in the wing.

WILLIAM LA HODNY.